Figure 1:
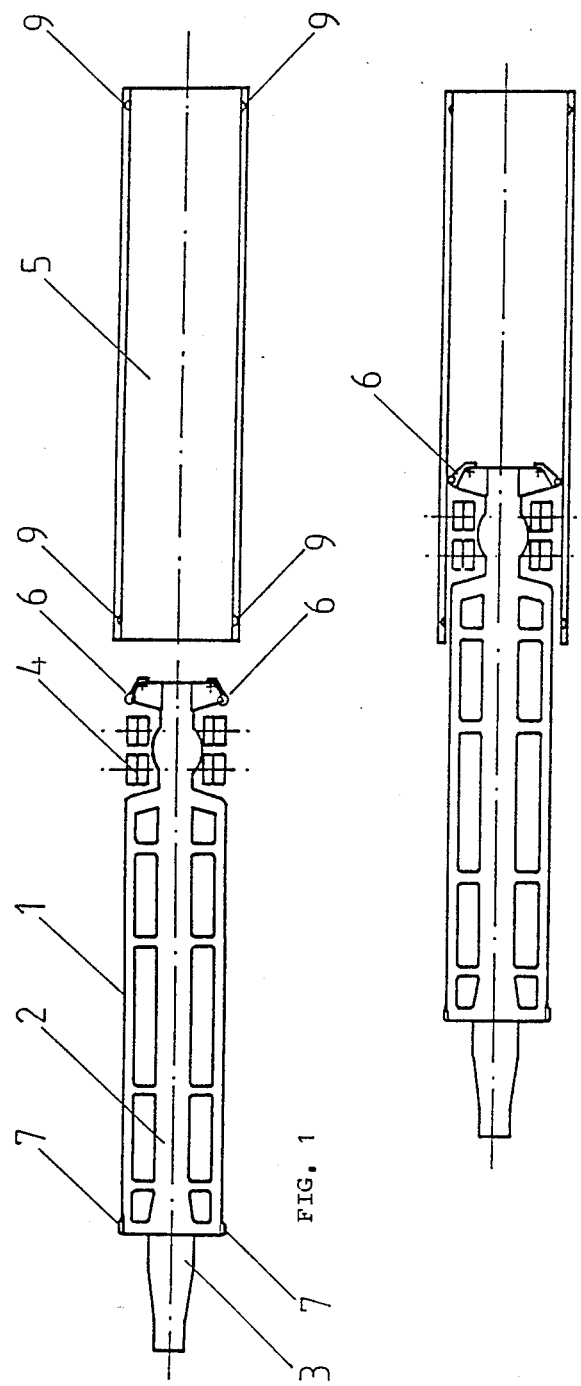

United States Patent [19]

Koskinen et al.

[11] Patent Number: 4,943,193
[45] Date of Patent: Jul. 24, 1990

[54] LOADING TRAILER

[75] Inventors: Matti Koskinen, Toijala; Pekka Brostrom, Oulu, both of Finland

[73] Assignee: Rautaruukki Oy, Oulu, Finland

[21] Appl. No.: 215,615

[22] Filed: Jul. 6, 1988

[30] Foreign Application Priority Data

Jul. 8, 1987 [FI] Finland ................... 873025

[51] Int. Cl.⁵ .............................. B60P 1/00
[52] U.S. Cl. ...................... 410/69; 410/89; 414/495; 414/498
[58] Field of Search ......... 410/52, 69, 77, 89, 410/2; 414/495, 498; 296/181, 182, 35.1, 35.3

[56] References Cited

U.S. PATENT DOCUMENTS

| | | | |
|---|---|---|---|
| 3,074,575 | 1/1963 | Terho | 414/498 |
| 3,425,576 | 2/1969 | Martin . | |
| 4,013,184 | 3/1977 | Lacy | 414/498 X |
| 4,470,748 | 9/1984 | Dickson-Simpson | 414/498 |
| 4,699,558 | 10/1987 | Hagge et al. | 414/495 X |

FOREIGN PATENT DOCUMENTS

| | | | |
|---|---|---|---|
| 2417394 | 10/1975 | Fed. Rep. of Germany . | |
| 8102389 | 12/1982 | Netherlands | 296/181 |
| 7603227-5 | 11/1977 | Sweden . | |
| 2154956 | 9/1985 | United Kingdom | 296/181 |
| 2172248 | 9/1986 | United Kingdom | 410/52 |

Primary Examiner—Margaret A. Focarino
Assistant Examiner—Dean J. Kramer
Attorney, Agent, or Firm—Seed and Berry

[57] ABSTRACT

The description relates to a loading trailer which comprises a wheel bogie (4), a chassis (2) supported by the wheel bogie, and a gooseneck (3) for connection to a drive vehicle. The chassis is lowerable and raisable in relation to the wheel bogie for the purpose of being driven under a flat bed (5) and for lifting the flat bed with its load. In order to facilitate the aligning of the loading trailer (1) when driving it under the flat bed, at least the rear part of the chassis (2) is equipped with aligning guides (6) which work against the inner sides of the flat bed (5). The aligning guides (6) are preferably made up of arms which extend obliquely forwards and are adjustable by hydraulic cylinders and which have at their ends guide rolls which in the final position can be locked in depressions (9) in the flat bed. The front part of the chassis (2) also has preferably guides (7), which may be fixed.

2 Claims, 3 Drawing Sheets

1

LOADING TRAILER

The present invention relates to a loading trailer which comprises at least one wheel bogie, a rigid chassis supported by the wheel bogie, and a coupling piece, the chassis being lowerable and raisable in relation to the bogie for the purpose of driving the trailer under a flat bed and for lifting a load, and at least in the rear part of the chassis there are aligning guides, symmetrical in relation to the center line of the chassis, which work in conjunction with the flat bed to achieve the desired mutual positioning of the chassis and the flat bed when the loading trailer is being driven under the load.

The loading trailer is primarily a short-range transfer device to be used in a harbor, by means of which flat beds with loads, for example transport containers, are transferred into the cargo spaces of a car ferry or a similar vessel. Such trailers with their flat beds are disclosed in, for example, Finnish Patent FI-59563 and patent application FI-841503. When a load is being transferred, the loading trailer is backed up under the flat bed, with the loadbearing chassis in the lower position, and the chassis is raised to the upper position in such a way that the flat bed with its load will bear on the loading trailer.

Driving the previously known loading trailers under a flat bed precisely on the center line of the flat bed is considerably difficult. In general, the inner surfaces of the legs of the flat beds are shaped as guides against which the sides of the loading trailer slide. It is common that during the lifting the flat bed is out of alignment with the intended position in relation to the loading trailer. In this case, especially when high loads are being handled, the risk of the load tipping over and, in addition, the disalignment of the flat bed complicate precise driving, especially in spaces on a ship's deck. In certain known flat beds, also the one depicted below, the alignment of the flat bed is arranged by means of wedge-like guide surfaces in the flat bed, which, during the lifting, force an unaligned flat bed to shift in relation to the loading trailer. However, this aligning method causes a risk of the load being damaged or even tipping over in the lifting situation. To facilitate precise driving of the loading trailer under a flat bed, Finnish patent application 841504 describes an automatic control system, which is, however, relatively expensive and difficult to implement in practice.

A loading trailer of the type mentioned in the preamble is known from publication SE 397 659. It has in the middle of the chassis of the loading trailer vertical pins which are guided by a longitudinal channel in the bottom of the skip.

The object of the present invention is to develop the conventional loading trailer further in such a way that it can be driven under a flat bed precisely in the correct position and that, when so desired, the flat bed taken for transfer can be locked to the chassis of the loading trailer. Locking the flat bed to the loading trailer is desirable, since braking forces tend to displace the flat bed especially when driven with a load, and on the other hand, owing to unevenness in road surface an empty flat bed will easily shift from its place on top of the loading trailer.

In order to achieve the objective presented, the invention is characterized in that the aligning guides comprise two obliquely turning arms which are mounted symmetrically on both sides of the chassis and the ends of which, when turned outwards, extend beyond the width of the main part of the chassis. The arms can preferably be locked to the flat bed. Preferably in the front part of the loading trailer there are also guides, which may be fixed, since the driver cannot steer them with sufficient precision by visual estimation. When needed, for example when flat beds of different widths are used, the front end of the trailer can also be equipped with adjustable guides and locking means.

In particular, hydraulically adjustable aligning means which achieve a correcting movement serve as impact cushions and slide means, saving both the flat bed and the trailer, while the trailer is being driven under the flat bed.

The invention is described below in greater detail in the form of an example and with reference to the accompanying drawings.

Figure 2:
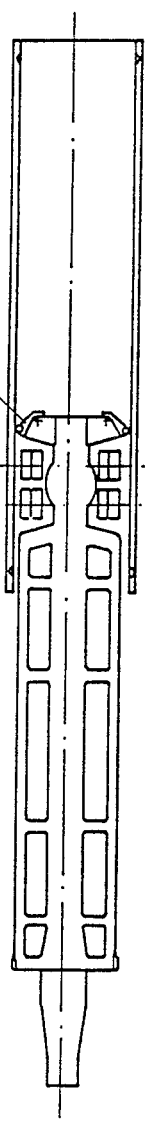
Figure 3:
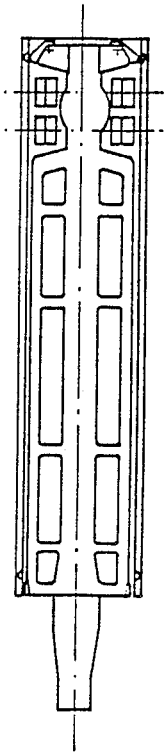
Figure 4:
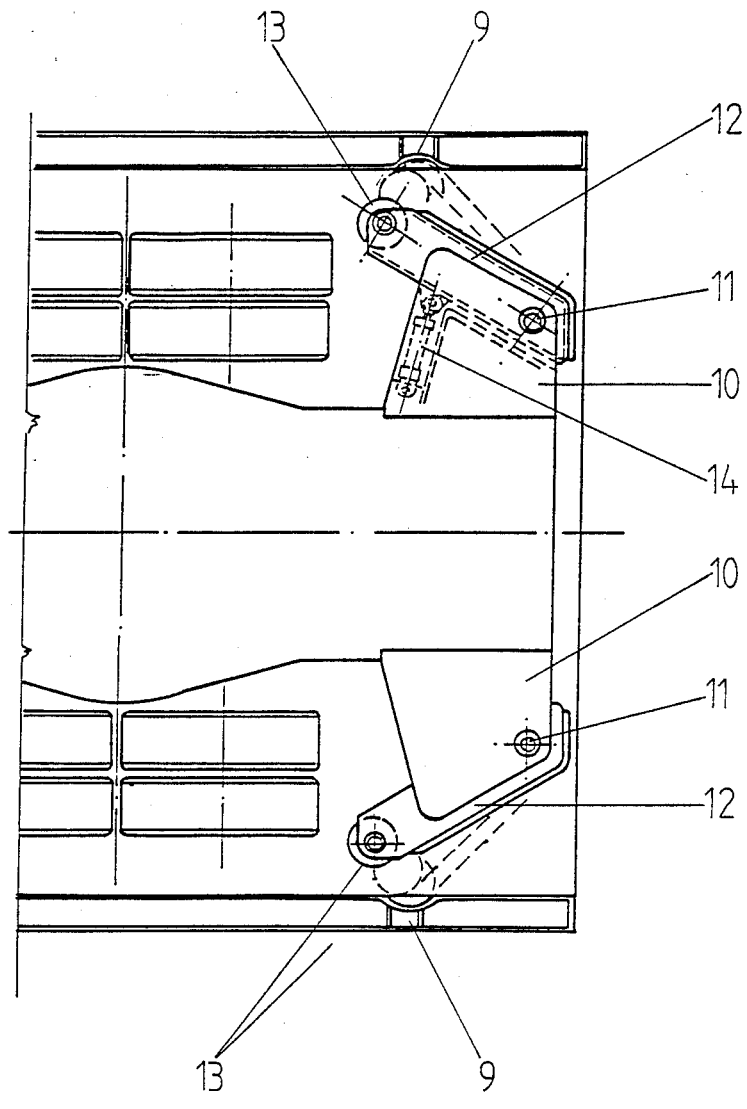
Figure 5:
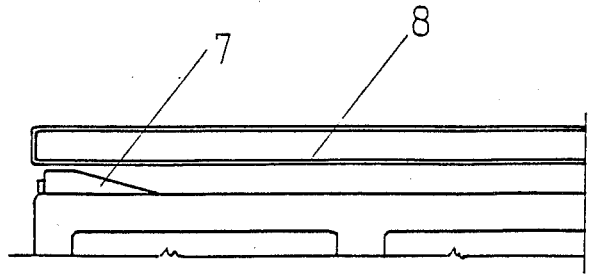
Figure 6A:
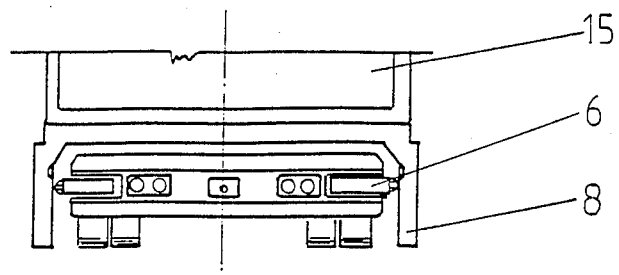
Figure 6B:
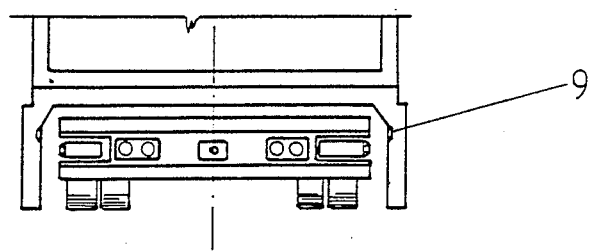
Figure 6C:
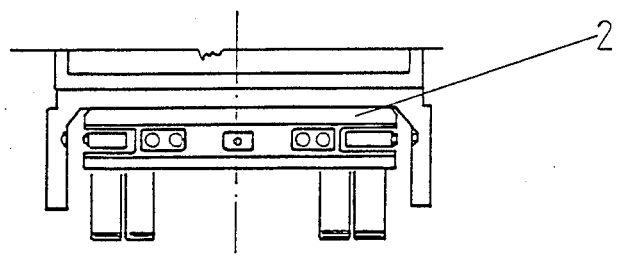
Figure 6D:
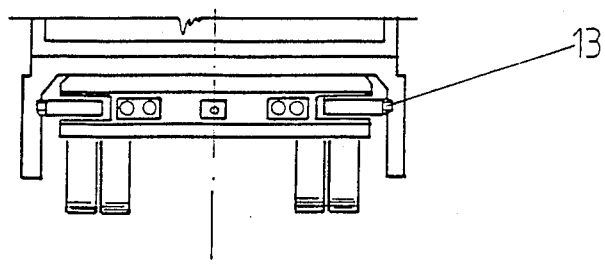

FIG. 1 depicts a schematic plan view of a loading trailer according to the invention and a flat bed. FIG. 2 depicts the driving of the loading trailer under the flat bed, and FIG. 3 the loading trailer driven into the correct position in relation to the flat bed. FIG. 4 depicts, enlarged, the aligning means in the rear part of the loading trailer driven under the flat bed, and FIG. 5 depicts respectively the wedge guides in the front part of the loading-trailer. FIGS. 6 a-d depict rear views of the loading trailer and the flat bed at the different stages of the use of the aligning guides:

in FIG. 6a in a situation corresponding to FIG. 2 in FIG. 6b in the final position, driven under the flat bed, before the lifting, in FIG. 6c with the flat bed raised, and in FIG. 6d with the flat bed locked to the loading trailer.

FIG. 1 depicts a loading trailer to be hauled by a drive vehicle; it is generally indicated by reference numeral 1. The loading trailer comprises a substantially flat chassis 2, which carries the load, wheel bogies 4, and a coupling piece 3, commonly called a gooseneck, for connection to the drive vehicle. Between the wheel bogie 4 and the chassis 2 there are lifting means, not depicted, by means of which the chassis can be raised in relation to the bogie. Lifting means between the wheel bogie and the chassis are well known previously, and one of these types has been used in, for example, in FI patent application 841503 mentioned above. The front part of the loading trailer is raised by the gooseneck 3 by means of lifting devices in the drive vehicle.

In FIG. 1, the loading trailer 1 and the flat bed 5 are depicted in their initial position before the trailer is driven under the flat bed. The rear part of the chassis 2 of the loading trailer 1 has adjustable aligning guides 6, and its front part has fixed side guides 7. The loading trailer is driven, rear end first, under the flat bed, and the aligning guides 6 are set at such a distance from the center line of the loading trailer as corresponds to the distance of the legs 8 of the flat bed 5 from the center line. In FIG. 2, the loading trailer is being driven under the flat bed 5 under the forceful guidance of the aligning guides 6. In FIG. 3, the wedge-like fixed side guides 7 of the loading trailer have guided also the front end of the loading trailer into the correct position in relation to the flat bed, and the loading trailer is in its final position also longitudinally. At this time the aligning guides 6 are on the same vertical line as are the depressions 9 in the legs of the flat bed.

FIG. 4 shows how the aligning guides 6 of the loading trailer comprise guide arms 12 which are articulated 11 to the chassis 10 and have guide rolls 13 carried in bearings. The position of the guide rolls 13 is adjusted by means of actuating cylinders 14 affecting the guide arms 12. In FIG. 4, the aligning guides are depicted in the retracted position, and by dotted lines in the position for driving under and in the locking position.

The setting of the aligning guides is described below in greater detail with the aid of FIGS. 6 a-d.

Before the loading trailer is driven under the flat bed, the aligning guides are retracted, and while the trailer is being driven under, they are in the guiding position according to FIG. 6a. In the driven-under position, FIG. 6b, the guide rolls 13 are retracted by means of cylinders 14 and, by raising the chassis of the loading trailer, the flat bed 5 with its load 15 is made to bear on the loadbearing chassis 2, FIG. 6c. Finally, FIG. 6d, the guide rolls 13 are pushed to their outermost position, into the depressions 9, in the legs of the flat bed; this locks the flat bed to the loading trailer.

The aligning and locking means according to the invention can be varied within the scope of the accompanying claims and, by applying known technology, they can be equipped with various position sensors and other auxiliary devices facilitating control.

We claim:

1. A loading trailer for picking up a flatbed, comprising:

a rigid chassis;

means for raising and lowering said rigid chassis; and a pair of aligning guides pivotally coupled to the rear of said chassis and being symmetrically arranged in relation to the center line of said chassis, said aligning guides being pivotal about a vertical pivot and including a pair of arms, said arms being extendable about said pivot from a position generally aligned with the side of said chassis to a position extending obliquely outward from said chassis, and extending beyond the width of the main part of the chassis.

2. The trailer according to claim 1 wherein said aligning guides include a locking member means for locking into said flatbed when in the extended position.

* * * * *